Feb. 2, 1943.  P. E. SCOTT  2,310,122
SELF CENTERING DEVICE FOR SEWER PIPES
Filed July 29, 1942

INVENTOR.
Paul E. Scott
BY John B. Hasty
ATTORNEY.

Patented Feb. 2, 1943

2,310,122

UNITED STATES PATENT OFFICE 2,310,122

SELF-CENTERING DEVICE FOR SEWER PIPES

Paul E. Scott, Chicago, Ill.

Application July 29, 1942, Serial No. 452,733

2 Claims. (Cl. 29—88.2)

The object of my invention is the production of a new and novel device for centering sewer pipes. According to current practice sewer pipes are generally aligned by means of a bell-and-spigot joint, the annular space in the bell or socket being calked with oakum, cement motar, or bituminous compounds. Axial alignment of the mated pipes is a matter of skill and experience. When the spigot and bell of the pipes are offset, not only is the flow retarded and eddy currents produced, but the life of the pipe is greatly impaired, and its usefulness substantially diminished.

A primary object of my invention is the production of an inexpensive, portable device adapted for slidable engagement with the periphery of the bell end of a pipe throughout approximately one-third of the circumference of the same, and securedly positioned thereon by means of frictional contact as will hereinafter be more fully explained.

No special training, equipment or skill is needed to affix my self-centering device to the pipe, as it may in fact be applied by a child or any person without technical training or mechanical skill. And the device is so inexpensive as to add very little, if any, to the costs of laying sewer pipes.

In the laying of sewer pipes it is essential that watertight and rootproof joints be obtained, and I have observed from experience that the weight of the spigot end of the pipe presses and squeezes out the jointing material from the bottom of the bell or socket of the pipe to which it is mated, substantially impairing and destroying the sewer pipe system.

My invention envisions the elimination of this fruitful source of sewer pipe derangement in a simple but highly efficient manner by causing the spigot end of the pipe to be supported by and mounted on the corrugations or folds in my self-centering device, as will hereinafter be more fully explained and illustrated. In view of the self-centering feature of my device, and the fact that it is capable of absorbing the force of compression; oakum, or similar fibrous substances, may be dispensed with as binding mediums, at least in pipes ranging in diameters from 3'' to 36''.

Having described in a general way the object and purpose of my invention, I will now proceed to give a detailed description of one specific embodiment of the same, it being understood, however, that this description is merely illustrative and not limitative.

Similar numerals refer to similar parts throughout the several views.

Figure 1:
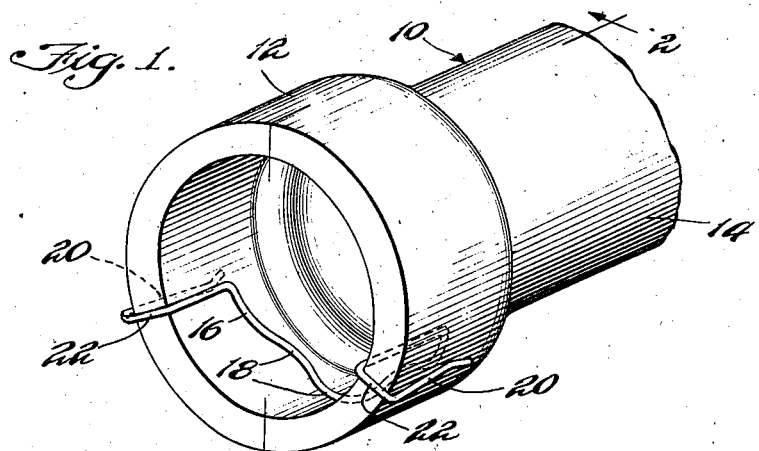
Fig. 1 is a perspective view of my improved self-centering device in operative position on the bell end of a pipe.
Figure 2:
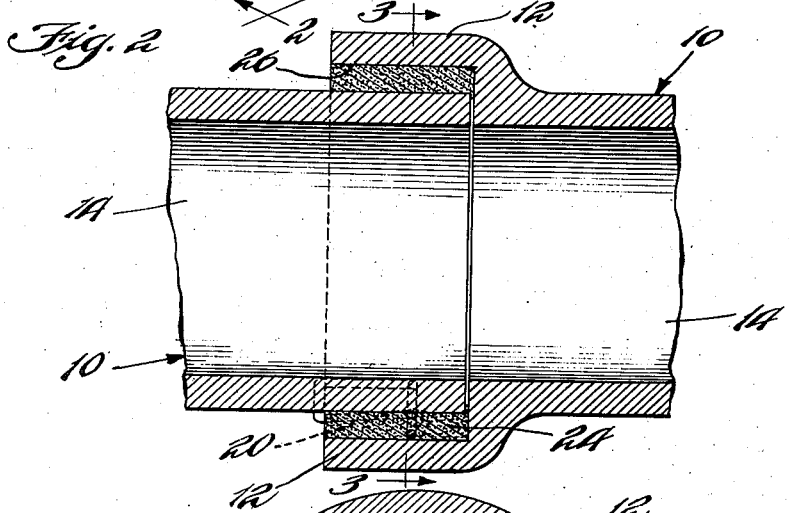
Fig. 2 is a longitudinal cross section taken generally on line 2—2 of Figure 1 with the device in operative position and with the spigot end of a pipe inserted in the opening, the annular space being filled with bituminous joint compound.

The reference character 10 indicates a sewer pipe generally, of standard construction; 12 is the bell end of the pipe, and 14 the spigot end of the same. My self-centering device 16 is best seen in perspective in Figure 1, comprising three or more corrugations or folds as indicated by the reference numerals 18. The respective ends of the device, indicated by reference character 20 are looped as at 22 and extend back and are slightly bent to hold the entire piece to bell of pipe 10. The legs or termini of the self-centering device may extend longitudinally along the periphery of the bell for any convenient distance depending upon the diameter of the pipe and the number of corrugations employed. Device 16 is constructed of hard steel wire, or the like, gauged to meet the requirements of various diameters ranging from 3'' to 36'', and of sufficient strength to securely hold or sustain the weight of the spigot end of pipe as shown at 14.

Figure 3:
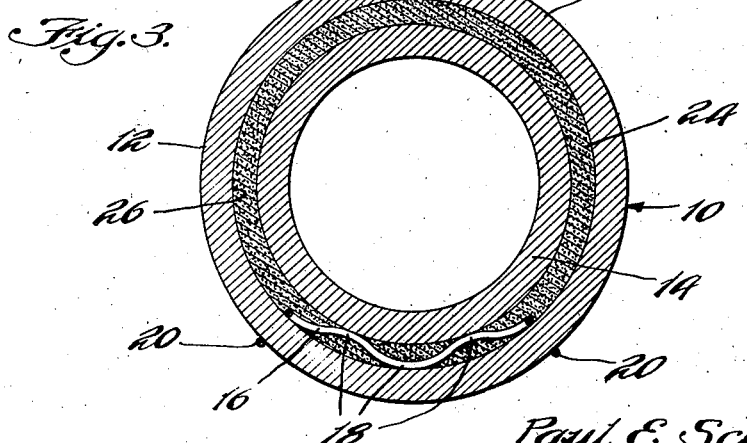
Fig. 3 is a cross section taken generally on the line 3—3 of Figure 2.

From Figure 3 it will be observed that when spigot 14 is inserted in bell 12, that the alternate corrugations or folds 18 sustain the weight of spigot 14, and that the crest of the respective corrugations 18 is of such height as to place the respective pipes in axial alignment, so that when fitted the respective ends of the pipes must have a common central axis. Reference character 24 indicates bituminous compound with which annular space 26 is filled to obtain watertight and rootproof joint.

From the foregoing it will be obvious that many advantages reside in the structural features of the invention, and the particular method of applying the same, and that modifications may be made in the same without departing from the spirit and scope of the invention, and hence I do not wish to be limited in any particular, rather what I seek to secure by United States Letters Patent is shown in the appended claims.

I claim:

1. In a self-centering device for sewer pipe the combination of a wire bent in the form of an inverted U at its opposite extremities and adapted to engage securely the opposite portions of the bell end of a pipe, so that the inner portions of the inverted U and the intermediate portion between the respective inverted U portions form a self-centering device to sustain the spigot of adjacent pipe.

2. In a self-centering device for sewer pipe the combination of a wire with its opposite ends bent to frictionally engage the periphery of the bell end of a pipe, with the intermediate portion of said wire seated in the inner periphery of the bell end of the pipe adjacent the end thereof adapted to receive and center the spigot end of a pipe.

PAUL E. SCOTT.